Oct. 10, 1961 H. M. HAWKINS 3,004,016
POLYMERIZATION PROCESS
Filed June 28, 1957
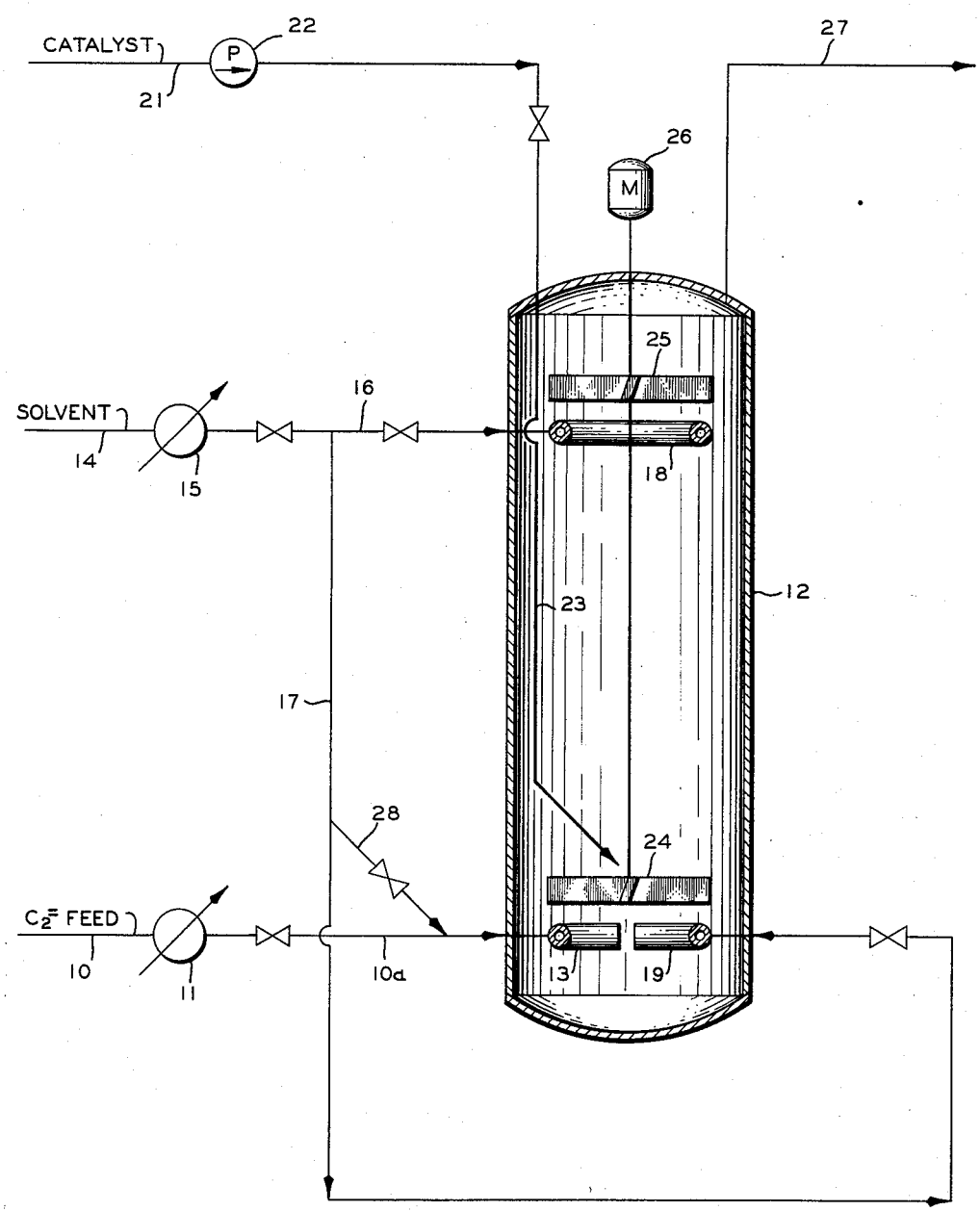
INVENTOR.
H.M. HAWKINS
BY Hudson and Young
ATTORNEYS

United States Patent Office 3,004,016
Patented Oct. 10, 1961

3,004,016
POLYMERIZATION PROCESS
Harold M. Hawkins, Bartlesville, Okla., assignor to Phillips Petroleum Company, a corporation of Delaware
Filed June 28, 1957, Ser. No. 668,762
10 Claims. (Cl. 260—93.7)

This invention relates to a method and means for the production of solid polymers from fluid monomers. In one aspect, it relates to a method and a means for the prevention of premature polymerization of the olefinic monomers entering the reactor. In another aspect, it relates to a method and means for preventing precipitation of solid polymer in the distributor employed in introducing the monomer into a polymerization reactor.

In many polymerization reactions such as the polymerization of ethylene in the presence of a liquid diluent or solvent to form high molecular weight polymers, the control of temperature and concentration of reactants is of utmost importance. One preferred method for polymerization of olefins is described in copending application Serial No. 573,877 filed March 26, 1956 by J. P. Hogan and R. L. Banks, now Patent No. 2,825,721, employing as a catalyst chromium oxide associated with at least one oxide selected from silica, alumina, zirconia, and thoria. In the operation of polymerization processes wherein an olefin such as ethylene is introduced into a reactor containing catalyst and a solvent or diluent, deviations from normal pressure, changes in flow rates of reactants or changes in other process variables can result in premature polymerization or in precipitation of polymer in the sparger employed to introduce the olefin so that it becomes plugged with solid polymer to the detriment of the process.

It is therefore an object of this invention to provide a method for preventing plugging of the feed sparger in a polymerization process. It is also an object of this invention to provide a means for preventing sparger plugging in a polymerization reactor. It is still another object of this invention to provide a method for polymerizing ethylene so that the feed inlets are maintained free of prematurely polymerized ethylene or precipitated polyethylene. Other objects and advantages will be apparent to those skilled in this art on study of the disclosure together with the accompanying drawing wherein:

A sectional, schematic view of a polymerization reactor illustrates a preferred modification of the invention.

I have discovered that the problem of plugging of the sparger, employed as the distributing means for introducing the monomer feed to a polymerization reactor, can be eliminated by introducing a minor amount of fluid diluent or solvent to the monomer stream just prior to its entry into the sparger. The addition of solvent to the monomer feed line will provide positive flow through the sparger in case the flow of monomer is stopped unexpectedly or in case pressure fluctuations are sufficient to encourage entrance of reactor contents to the sparger.

Referring now to the drawing, there is shown a sectional view of a conventional polymerization reactor such as that described in copending application Serial No. 573,877, now Patent No. 2,825,721 hereinbefore referred to and copending application Serial No. 580,770 filed April 26, 1956 by R. F. Dye, now Patent No. 2,875,027. A polymerizable monomer such as ethylene is introduced via conduit 10 and heat exchanger 11 to reactor 12 through sparger 13. A suitable fluid diluent or solvent is introduced to reactor 12 via conduit 14, heat exchanger 15 and conduits 16 and 17, through spargers 18 and 19. Finely divided catalyst maintained as a slurry suspended in polymer solvent is introduced to reactor 12 via conduit 21 and pump 22 and conduit 23 so as to be deposited in a vortex created within reactor 12 by mixing impellers 24 and 25. Impellers 24 and 25 maintain the contents of reactor 12 in a state of agitation and are caused to rotate by means of motor 26. Polymer dissolved or suspended in solvent is removed from reactor 12 via conduit 27.

Solvent is passed via conduit 28 into conduit 10a just upstream from the connection of line 10a with sparger 13. The flow of solvent can be controlled within desired limits by the valve in line 28 which will be, preferably a globe valve or more preferably a motor valve so that the amount of solvent will always be a predetermined ratio of the monomer feed at normal feed rates, and so that a minimum amount of flow of solvent will be provided at all times, including times of zero monomer feed.

Various necessary items of equipment, such as flow controllers, pumps, temperature controllers, etc. have been omitted from the drawing in order to simplify the drawing. Those skilled in the art will be aware of the proper equipment to use.

The catalyst employed in the polymerization reaction contains from 0.1 to 10 or more weight percent of chromium oxide, preferably including a substantial proportion of hexavalent chromium associated with at least one porous oxide selected from the group consisting of silica, alumina, zirconia and thoria. A preferred catalyst is one comprising 0.1 to 10 or more weight percent chromium as chromium oxide supported upon a silica-alumina base such as 90% silica-10% alumina. The catalyst employed is usually a highly oxidized catalyst which has been activated by a treatment at elevated temperature under non-reducing conditions and preferably in an oxidizing atmosphere.

Normally gaseous olefins are ordinarily preferred as the feed material in the polymerization process to produce solid polymers however, any 1-olefin containing up to 8 carbon atoms per molecule, and no chain branching nearer the double bond than the 4-position, can be utilized. Ethylene, propylene, 1-butene, 1-pentene are commonly employed in preparing solid polymers. However, ethylene and propylene, are in general use at the present time. Diolefins, such as 1,3-butadiene, are within the scope of this invention.

Polymerization usually is carried out with at least part of the monomer and at least part of the polymer in solution in a hydrocarbon solvent, especially a paraffin or a cycloparaffin which is liquid under the polymerization conditions. Solvents which can be employed include low boiling paraffinic and cycloparaffinic hydrocarbons such as cyclobutane, cyclopentane, cyclohexane, n-butane, n-pentane, n-hexane, isobutane, isopentane and isohexane. Solvents must be inert with respect to the polymer and to the 1-olefin and also non-poisonous with respect to the catalyst. Thus, the solvents must be substantially free from water, oxygen, certain sulfur compounds such as hydrogen sulfide, halogens, and other materials which act as poisons to the catalysts employed. Low molecular weight paraffins and cycloparaffins satisfy the above requirements since these materials are inert to the catalyst, to the 1-olefin and to the polymer.

The invention is also applicable to the production of copolymers. Thus a minor portion of solvent can be introduced with a comonomer stream to a polymerization reaction to prevent plugging of the comonomer distributor outlets.

The following specific embodiment will be helpful in understanding the invention but is not to be construed as limiting the invention.

The invention was practiced in a reactor substantially as shown in the drawing and in a typical run the monomer, solvent and catalyst were introduced in the ratio of 34,140 pounds of monomer (ethylene), 237,135 pounds of solvent (cyclohexane), and 2,725 pounds of slurry of catalyst (chromium oxide supported upon silica-alumina) per stream day. The slurry of catalyst contained about 10 weight percent catalyst in cyclohexane.

The temperature of the ethylene feed stream was maintained at about 260° F., the catalyst slurry feed stream temperature was about 195° F. and the solvent feed stream was maintained between about 234 and 260° F. The reactor temperature was maintained at about 285° F. and the reactor pressure was about 500 p.s.i.a. About 90 percent of the solvent stream was divided between ring sparger 18 and semi-ring sparger 19. The remaining solvent, about 10 percent of the total, was passed via conduits 28 and 10a to semi-ring sparger 13 along with the ethylene feed.

The flow of solvent through conduit 28 was manually controlled at about 10 percent of the total solvent feed as indicated by a rate of flow indicator in conduit 10a (not shown).

The outlets in sparger 13 remained free of solid polymer during the run with solvent being passed through conduit 28; whereas these outlets had become plugged with solid polymer in previous runs without solvent being passed through conduit 28.

It is not intended that the invention be limited by a theory of operation, however, it is believed that the introduction of a small amount of liquid solvent along with the monomer feed prevents the monomer-saturated solvent which is present in the reactor and contains catalyst, from entering the sparger through the outlets. The reactor contents, monomer-saturated solvent containing catalyst and polymer, tends to enter the sparger outlets during upset conditions of pressure in the reactor and in the monomer feed system. Catalyst present in the solution in the reactor tends to remain in the sparger, having once gained admission thereto, and catalyzes polymer formation therein. The liquid solvent, which is admitted with the gaseous monomer, appears to have a hydraulic or washing effect upon the catalyst or the polymer which gains entrance into the sparger so as to remove such material whereas the gaseous monomer is incapable of doing so.

The amount of liquid solvent added with the monomer will be in the range of 10 to 100 weight percent of the total normal monomer flow. The amount of solvent admitted with the monomer can be controlled automatically as a function of the rate of flow of monomer by conventional flow control means, if desired. A minimum flow can be assured by a suitable by-pass so that solvent flow will continue in case the monomer flow fails.

Variations and modifications are possible within the scope of the disclosure of the invention, the essence of which is the discovery that a minor amount of solvent introduced with the monomer feed to a polymerization reaction will prevent plugging of the feed distributor outlets, and a means for accomplishing the introduction of solvent to the monomer stream.

That which is claimed is:

1. In a process for the polymerization of a 1-olefin containing up to 8 carbon atoms per molecule and having no branching nearer the double bond than the 4 position, in the presence of a catalyst comprising a minor proportion of chromium as chromium oxide, and containing a substantial amount of hexavalent chromium, associated with at least one oxide selected from the group consisting of silica, alumina, zirconia and thoria, said catalyst being suspended in a liquid hydrocarbon solvent for the polymer in a polymerization zone at polymerization conditions wherein the 1-olefin is sparged into the suspension of catalyst in liquid hydrocarbon in said polymerization zone and the liquid hydrocarbon is introduced into said polymerization zone at a plurality of points and separately from said olefin, the improvement comprising admixing a portion of said liquid hydrocarbon solvent, in an amount of about 10 to about 100 weight percent of said olefin, with said olefin; and sparging the resulting admixture into said polymerization zone.

2. The process of claim 1 wherein the olefin is ethylene and the solvent is cyclohexane.

3. The process of claim 1 wherein the olefin is propylene and the solvent is cyclohexane.

4. The process of claim 1 wherein the olefin is ethylene and the solvent is a liquid hydrocarbon selected from the group consisting of paraffins and naphthenes.

5. In a process for the polymerization of a normally gaseous 1-olefin, having no branching nearer the double bond than the 4 position, to a solid polymer which comprises polymerizing said olefin in the presence of a finely divided catalyst comprising a minor proportion of chromium as chromium oxide, and containing at least about 0.1 weight percent of hexavalent chromium, associated with at least one oxide selected from the group consisting of silica, alumina, zirconia and thoria, said catalyst being suspended in a liquid hydrocarbon which is a solvent for the polymer in a reaction zone at polymerization conditions of temperature and pressure, the improvement comprising introducing a first portion of solvent into the upper portion of said reaction zone; introducing a second portion of solvent into the lower portion of said reaction zone, said first and second portions comprising a major portion of said solvent; introducing a slurry of finely divided solid catalyst in solvent into said reaction zone; and introducing said olefin in admixture with about 10 to about 100 weight percent of said olefin of solvent to the lower portion of said reaction zone through a sparger spaced from the point of introduction of solvent and catalyst and maintaining the introduction of solvent substantially constant regardless of variations in the introduction of olefin.

6. In a process for the polymerization of a 1-olefin containing up to 8 carbon atoms per molecule and having no branching nearer the double bond than the 4 position, in the presence of a finely divided catalyst comprising a minor proportion of chromium as chromium oxide, and containing a substantial amount of hexavalent chromium, associated with at least one oxide selected from the group consisting of silica, alumina, zirconia and thoria, said catalyst being suspended in a liquid hydrocarbon diluent in a polymerization zone at polymerization conditions wherein the 1-olefin is sparged into the suspension of catalyst in liquid hydrocarbon in said polymerization zone and the liquid hydrocarbon is introduced into said polymerization zone at a plurality of points and separately from said olefin, the improvement comprising admixing a minor portion of said liquid hydrocarbon, in an amount sufficient to maintain a positive sparging flow, with said olefin; and sparging the resulting admixture into said polymerization zone.

7. A process which comprises polymerizing a 1-olefin containing up to 8 carbon atoms per molecule and having no branching nearer the double bond than the 4 position, at a polymerization temperature up to about 500° F., with a catalyst active for such polymerization and comprising, as the sole essential effective catalytic ingredient thereof, chromium oxide and at least one material selected from the group consisting of silica, alumina, zirconia, and thoria, at least part of the chromium being in the hexavalent state at the initial contacting of olefin with said catalyst, said catalyst being suspended in a liquid hydrocarbon solvent which is liquid and inert under the polymerization conditions; sparging said 1-olefin into the suspension of catalyst in liquid hydrocarbon in said polymerization zone, adding a first portion of a liquid hydrocarbon to the suspension of catalyst in liquid hydrocarbon at a plurality of points and separately from said olefin; admixing a second portion of said liquid hydrocarbon, in an amount of about 10 percent of the total of said liquid hydrocarbon, with said olefin; sparging the resulting mixture into said suspension of catalyst in liquid hydrocarbon; and recovering a solid polymer from said suspension of catalyst in liquid hydrocarbon.

8. The process of claim 7 wherein the olefin is ethylene and the solvent is cyclohexane.

9. The process of claim 7 wherein the olefin is propylene and the solvent is cyclohexane.

10. A process which comprises polymerizing a 1-olefin containing up to 8 carbon atoms per molecule and having no branching nearer the double bond than the 4 position, at a polymerization temperature up to about 500° F., with a catalyst active for such polymerization and comprising, as the sole essential effective catalytic ingredient thereof, chromium oxide and at least one material selected from the group consisting of silica, alumina, zirconia, and thoria, at least part of the chromium being in the hexavalent state at the initial contacting of olefin with said catalyst, said catalyst being suspended in a first portion of a liquid hydrocarbon solvent which is liquid and inert under the polymerization conditions; sparging said 1-olefin into the suspension of catalyst in liquid hydrocarbon through said polymerization zone; introducing said first portion of said liquid hydrocarbon solvent into said polymerization zone at a plurality of points and separately from said olefin and at a temperature sufficient to remove heat of polymerization from said suspension of catalyst in said polymerization zone; admixing a second portion of said liquid hydrocarbon solvent, in an amount of about 10 to about 100 weight percent of said olefin, with said olefin; sparging the resulting admixture into said polymerization zone; and recovering a resulting solid polymer from said polymerization zone.

References Cited in the file of this patent

UNITED STATES PATENTS

| | | |
|---|---|---|
| 2,085,524 | De Simo et al. | June 29, 1937 |
| 2,542,559 | Nelson et al. | Feb. 20, 1951 |
| 2,815,334 | Killey et al. | Dec. 3, 1957 |
| 2,825,721 | Hogan et al. | Mar. 4, 1958 |
| 2,885,389 | Schappert | May 5, 1959 |
| 2,889,314 | Fritz | June 2, 1959 |
| 2,899,401 | Eby | Aug. 11, 1959 |